(12) United States Patent
Harmatos et al.

(10) Patent No.: US 12,436,851 B2
(45) Date of Patent: Oct. 7, 2025

(54) METHODS AND APPARATUSES FOR PROVIDING A BACK-UP SERVICE

(71) Applicant: Telefonaktiebolaget LM Ericsson (publ), Stockholm (SE)

(72) Inventors: János Harmatos, Budapest (HU); Dávid Jocha, Budapest (HU); Róbert Szabó, Budapest (HU); Balázs Peter Gerö, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 53 days.

(21) Appl. No.: 18/034,290

(22) PCT Filed: Nov. 5, 2020

(86) PCT No.: PCT/EP2020/081122
§ 371 (c)(1),
(2) Date: Apr. 27, 2023

(87) PCT Pub. No.: WO2022/096100
PCT Pub. Date: May 12, 2022

(65) Prior Publication Data
US 2023/0393957 A1    Dec. 7, 2023

(51) Int. Cl.
*G06F 11/00* (2006.01)
*G06F 11/14* (2006.01)
*G06F 11/20* (2006.01)

(52) U.S. Cl.
CPC ........ *G06F 11/203* (2013.01); *G06F 11/1464* (2013.01); *G06F 11/1469* (2013.01); *G06F 11/2041* (2013.01)

(58) Field of Classification Search
CPC ............... G06F 11/203; G06F 11/1464; G06F 11/1469; G06F 11/2041; G06F 11/1451; G06F 11/1461
See application file for complete search history.

(56) References Cited

U.S. PATENT DOCUMENTS

2006/0190766 A1    8/2006  Adler et al.

FOREIGN PATENT DOCUMENTS

| EP | 2600565 A1 | 6/2013 | |
|----|------------|--------|---|
| EP | 3588855 A1 * | 1/2020 | ......... H04L 41/0654 |
| WO | 2021224666 A1 | 11/2021 | |

OTHER PUBLICATIONS

ETSI, "Network Functions Virtualisation (NFV); Reliability; Report on Models and Features for End-to-End Reliability", Group Specification, ETSI GS NFV-REL 003 V1.1.1, Apr. 2016, pp. 1-105, ETSI.

(Continued)

*Primary Examiner* — Katherine Lin
(74) *Attorney, Agent, or Firm* — Sage Patent Group

(57) ABSTRACT

Embodiments described herein relate to methods and apparatuses for providing a back-up service. A method in a reliability lifecycle manager (RLCM) is provided for managing orchestration of a back-up service for an original service. The method comprises receiving an indication of successful deployment of at least a first part of an original service from a first network domain, wherein the at least part of the original service comprises at least a first network function; responsive to the indication, transmitting a restoration preparation request to the first network domain to request that the first network domain initiate determination of a back-up service for the first part of the original service, the back-up service comprising a first back-up network domain capable of deploying the first network function, wherein the first back-up network domain is different to a first original network domain deploying the first network function in the original service; and responsive to transmitting the restoration preparation request, receiving a restoration response comprising an indication of the back-up service.

18 Claims, 15 Drawing Sheets

---

501 Receive an indication of successful deployment of at least a first part of an original service from a first network domain, wherein the at least part of the original service comprises at least a first network function 502 Responsive to the indication, transmit a restoration preparation request to the first network domain to request that the first network domain orchestrate determination of a back-up service for the first part of the original service, the back-up service comprising a first back-up network domain capable of deploying the first network function, wherein the first back-up network domain is different to a first original network domain deploying the first network function in the original service 503 Responsive to transmitting the restoration preparation request, receive a restoration preparation response comprising an indication of the back-up service

(56) References Cited

OTHER PUBLICATIONS

ETSI, "Zero-touch network and Service Management (ZSM); Closed-Loop Automation; Part 2: Solutions for automation of E2E service and network management use cases", Group Specification, ETSI GS ZSM 009-2 V1.1.1, Jun. 2022, pp. 1-30, ETSI.
ETSI, "Netowrk Functions Virtualisation (NFV) Release 3; Reliability; Report on NFV Resiliency for the Support of Network Slicing", Group Report, ETSI GR NFV-REL 010 V3.1.1, Jun. 2019, pp. 1-39, ETSI.

* cited by examiner

METHODS AND APPARATUSES FOR PROVIDING A BACK-UP SERVICE

TECHNICAL FIELD

Embodiments described herein relate to methods and apparatuses for providing a back-up service for an original service.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In a multi-provider, multi-domain ecosystem, a customer service that comprises multiple, dependent service components (i.e. Network Functions—NF) may span over multiple domains owned by different providers, resulting a complex end-to-end service management task. This may be especially complex if it is desirable for the service instance to be deployed with some reliability, in other words with some tolerance to infrastructure failure.

Reliability can be achieved in several ways, one well-known technique is closed loop-based self-healing. In closed loop based self-healing, a monitoring entity may be used to detect if a failure occurs, then the root-cause of the failure may be analyzed to determine the actions that will restore the service. Impacted service components, and the related connectivity between the service components, may then be automatically restored (e.g., re-deployed in another provider infrastructure domain) in order to restore the service.

Alternatively, pre-deployed active or backup service components could be used, which can take over the task of the impacted service components if failure occurs. One of the issues with pre-deployed active or backup service components is that an infrastructure failure typically impacts more than one service instance, and as 1+1 or at least N+M type redundancy is typically be applied, this can lead to significant resource needs for the backup components.

A failover time (the time between a failure occurring and the restoration of a working service) comprises two main parts, as illustrated in FIG. 1.

In particular the failover time comprises a failure fault detection time, which is the time taken for the monitoring system to detect the failure, and restoration time, which is the time taken for the system to restore the service.

During the fault detection time a monitoring system detects the fault and the relevant fault handling logic (a fault management entity) is notified. Then the restoration phase is started, where the required restoration actions are determined and the impacted service components/parts (e.g., NFs and connections) are re-deployed by the orchestration system.

The length of the fault detection time can efficiently be decreased by using advanced fault detection capabilities. However, the restoration time may be quite long as well, and an upper limit on the restoration time is difficult to guarantee due to the following reasons:

The orchestration process is slow in a multi-provider, multi-domain environment, since the deployment request may travel through multiple operators, which could be a time-consuming process, requiring the interworking of different domains. An end-to-end customer service may also require the interworking of different providers. Since partner providers typically only share abstracted information (relating to for example the resources and topology of a domain) with each other the restoration of the impacted services may need multiple deployment trials to find a proper backup deployment scenario.

In the case of hierarchical orchestration, the deployment request of a service component (NF) could be sent through multiple hierarchy levels, which further increases the restoration time. For example, a Service Orchestrator may manage the service request in end-to-end context, a level down in the hierarchy from the Service Orchestrator may compose the per-domain Network Function Virtualization Orchestrators (NFVOs), while Virtualization Infrastructure Managers (VIMs) may handle the particular service components on infrastructure level. Furthermore, the ETSI Zero-touch network and Service Management (ZSM) standardization working group proposes a generic, hierarchical architecture framework for Zero-touch network management. The architecture distinguishes the end-to-end (E2E) service management (responsible for E2E aspect of a customer facing service) and management domain levels (domains could be technology [e.g., radio access network (RAN), Core network, transport] or administrative). The framework enables stacked management domains that further increase the hierarchical levels. If a failure cannot be handled by a single management domain then other ones as well as the E2E service management domain may need to be involved, resulting a complex, time-consuming restoration process.

It is also possible that a deployment trial is not successful, for example if only the part of the service can be restored, and another trial must be performed.

Considering the aforementioned reasons it can be determined that the problem with service restoration is not just the length of the restoration time, but also that it is practically very difficult to guarantee an upper limit for the restoration time to give as a service level agreement (SLA) parameter.

Even if the fault detection time is decreased the restoration time is still significant and also uncertain, as illustrated in FIG. 2.

A problem with the 1+1, N+M type redundancy solutions is that there is resource usage for the backup service components. The backup components are typically not used in normal conditions, but they are still deployed, so the compute, storage, network resources are reserved for them. These reserved resources are therefore unused during normal circumstances (when there is no failure), but they cannot be used elsewhere. This decreases the resources that can be offered by a certain domain for other incoming service requests.

Since a service instance may span over multiple domains, a single failure may impact only a part of the service. However, the resources for the backup service may need to be allocated considering all possible failure cases, which may result in quite complex backup resource reservation for each service instance. On the other hand, one (infrastructure) failure may impact a multitude of service instances, which means that the sharing of the backup service components in the case of N+M redundancy may be limited, which may also lead to a large number of resources needing to be reserved for the backup components.

SUMMARY

According to some embodiments there is provided a method in a Reliability Life-Cycle Manager (RLCM) for managing orchestration of a back-up service for an original service. The method comprises receiving an indication of successful deployment of at least a first part of an original service from a first network domain, wherein the at least part of the original service comprises at least a first network function; responsive to the indication, transmitting a restoration preparation request to the first network domain to request that the first network domain initiate determination of a back-up service for the first part of the original service, the back-up service comprising a first back-up network domain capable of deploying the first network function, wherein the first back-up network domain is different to a first original network domain deploying the first network function in the original service; and responsive to transmitting the restoration preparation request, receiving a restoration response comprising an indication of the back-up service.

According to some embodiments there is provided a method, in an orchestrator of a first network domain. The method comprises transmitting an indication of successful deployment of at least a first part of an original service to a Reliability Life-Cycle Manager, RLCM, wherein the at least part of the original service comprises a first network function; responsive to transmitting the indication of successful deployment, receiving a restoration preparation request from the RLCM that requests that the first network domain initiate a determination of a back-up service for the first part of the original service, the back-up service comprising a first back-up network domain capable of deploying the first network function, wherein the first back-up network domain is different to a first original network domain deploying the first network function in the original service; responsive to the restoration preparation request, initiating determination of the back-up service; and transmitting a restoration response comprising an indication of the back-up service to the RLCM.

According to some embodiments there is provided a method, in an orchestrator of a second network domain. The method comprises receiving, from a first network domain, a restoration preparation request relating to a back-up service, wherein the back-up service comprises at least a second network function that the first network domain is not capable of deploying; determining whether the second network domain is capable of deploying any of the back-up service; responsive to the second network domain being unable to deploy any of the back-up service, forwarding the restoration preparation request to a third network domain; and responsive to the second network domain being able to deploy the second network function, indicating to the first network domain that the second network domain is capable of deploying the second network function.

According to some embodiments there is provided a method, in an orchestrator of a first original network domain, wherein the first original network domain is deploying a first network function for use in an original service. The method comprises transmitting an indication of successful deployment of at least a first part of the original service to a first network domain, wherein the at least part of the original service comprises at least the first network function; prior to failure of the first network function, receiving an indication of a back-up service for the first part of the original service; and responsive to a failure of the first network function, initiating deployment of the back-up service.

According to some embodiments there is provided a Reliability Life-Cycle Manager (RLCM) for managing orchestration of a back-up service for an original service. The RLCM comprises processing circuitry configured to: receive an indication of successful deployment of at least a first part of an original service from a first network domain, wherein the at least part of the original service comprises at least a first network function; responsive to the indication, transmit a restoration preparation request to the first network domain to request that the first network domain initiate determination of a back-up service for the first part of the original service, the back-up service comprising a first back-up network domain capable of deploying the first network function, wherein the first back-up network domain is different to a first original network domain deploying the first network function in the original service; and responsive to transmitting the restoration preparation request, receive a restoration response comprising an indication of the back-up service.

According to some embodiments there is provided an orchestrator of a first network domain. The orchestrator comprises processing circuitry configured to: transmit an indication of successful deployment of at least a first part of an original service to a Reliability Life-Cycle Manager, RLCM, wherein the at least part of the original service comprises a first network function; responsive to transmitting the indication of successful deployment, receive a restoration preparation request from the RLCM that requests that the first network domain initiate determination of a back-up service for the first part of the original service, the back-up service comprising a first back-up network domain capable of deploying the first network function, wherein the first back-up network domain is different to a first original network domain deploying the first network function in the original service; responsive to the restoration preparation request, initiate determination of the back-up service; and transmit a restoration response comprising an indication of the back-up service to the RLCM.

According to some embodiments there is provided an orchestrator of a second network domain. The orchestrator comprises processing circuitry configured to: receive, from a first network domain, a restoration preparation request relating to a back-up service, wherein the back-up service comprises at least a second network function that the first network domain is not capable of deploying; determine whether the second network domain is capable of deploying any of the back-up service; responsive to the second network domain being unable to deploy any of the back-up service, forward the restoration preparation request to a third network domain; and responsive to the second network domain being able to deploy the second network function, indicate to the first network domain that the second network domain is capable of deploying the second network function.

According to some embodiments there is provided an orchestrator of a first original network domain, wherein the first original network domain is deploying a first network function for use in an original service. The orchestrator comprises processing circuitry configured to: transmit an indication of successful deployment of at least a first part of the original service to a first network domain, wherein the at least part of the original service comprises at least the first network function; prior to failure of the first network function, receive an indication of a back-up service for the first part of the original service; and responsive to a failure of the first network function, initiate deployment of the back-up service.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
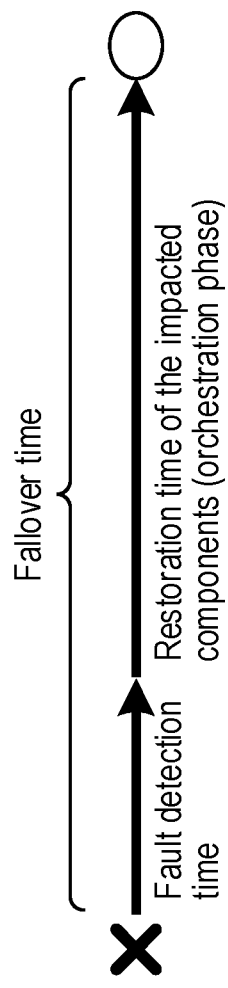
FIG. 1 illustrates a failover time.
Figure 2:
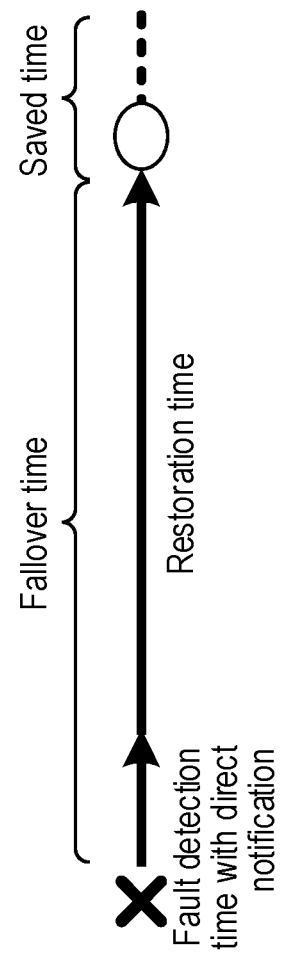
FIG. 2 illustrates a failover time when the fault detection time is decreased.
Figure 3:
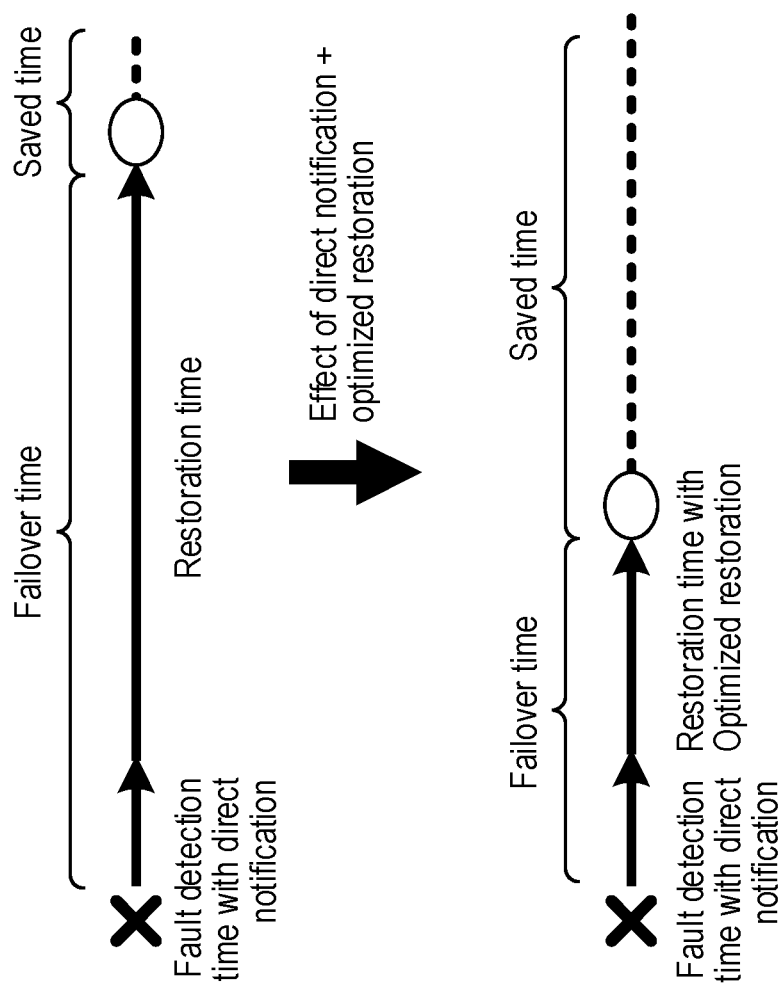
FIG. 3 illustrates a failover time with a decreased restoration time.

As previously mentioned, a significant part of the restoration time is the time taken to re-deploy the impacted service components handled by the orchestration process when a failure occurs. Embodiments described herein therefore provide methods and apparatuses which enable for decreasing of the restoration time as well as potentially providing an upper limit for the restoration time, resulting a significantly decreased, and more predictable, failover time as illustrated in FIG. 3.

In particular embodiments described herein utilize a restoration trial process which is started by a service-aware entity called a Reliability Life-cycle manager (RLCM) just after the original service request is successfully deployed. The orchestrators of the involved domains may then perform a deployment trial (e.g. trialing the Network Function (NF) placement with connectivity), to check if the backup service for a part of a service can be deployed by the domains. However, the resulting configuration is not deployed in order to spare domain resources. Meanwhile all the involved domains indicate to the RLCM that they can deploy backup service components when a failure occurs. The involved domains may also indicate the time that it will take to deploy the back-up service components.

If a failure occurs the RLCM (centralized mode) or the original network domain(s) where the impacted service part(s) are originally deployed (distributed mode) initiate realization of the backup deployment plan, for example, by sending direct trigger(s) to the domain(s) that manage the deployment of the backup NFs and any related connectivity.

By using this process, the time-consuming part of the restoration is already performed in the deployment phase of the original service request, so if a failure occurs, the required backup components may be deployed for restoring the service in the a reduced time.

Figure 4:
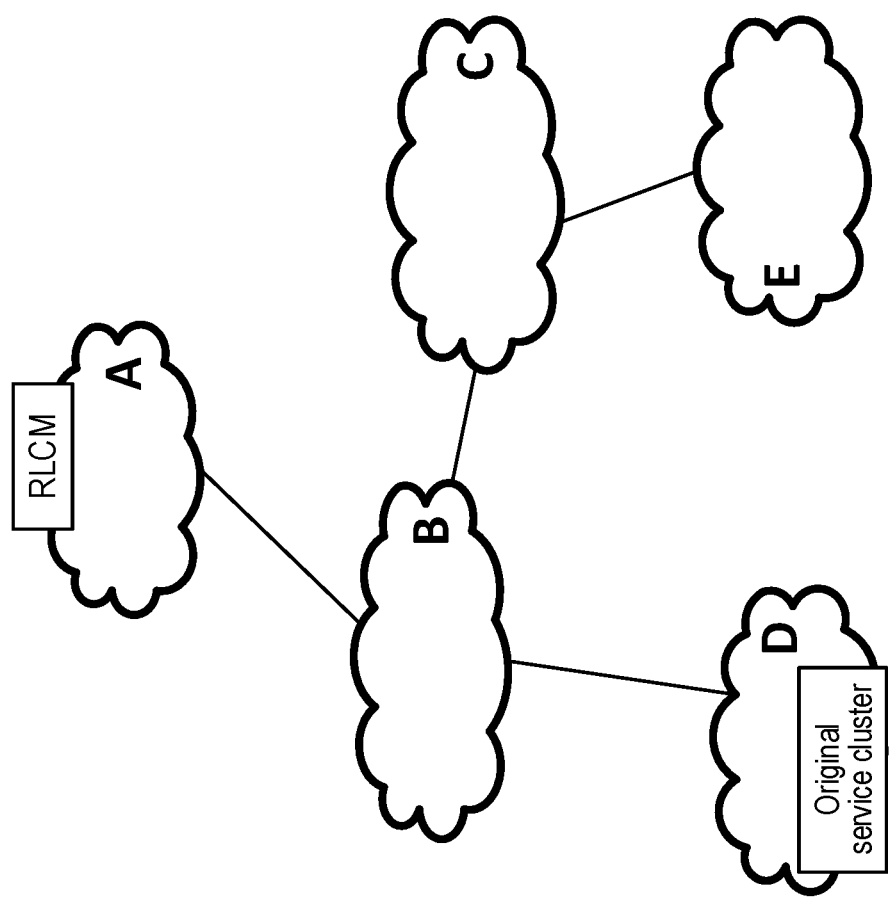
FIG. 4 illustrates an example orchestrator topology.

FIG. 4 illustrates an example orchestrator topology. This topology will be used herein to explain the embodiments of the invention. It will be appreciated that many different topologies are possible.

In this example, an RLCM is located in domain A. There are four other domains, domain B to domain E. As an example, consider a service that comprises two network function, NF1 and NF2. It will be appreciated that a service may comprise more than two network functions.

In some examples a service may be clustered, forming shared risk groups referred to as restoration clusters. The clustering may be performed on the basis of service description (e.g. describe the dependency among the NF components belonging to a service) and/or deployment information of the current service instance (e.g. if given NFs are deployed in the same domain, then a failure in the domain could impact each of them). The components within a cluster are dependent on each other, if any of them is impacted by a failure, all components belonging to the cluster may be impacted, and may therefore be restored.

In this example, therefore, the network functions NF1 and NF2 form part of a cluster that is deployed in domain D. It will however be appreciated that in some examples, a service may be deployed across multiple domains, and in some cases multiple providers. It will also be appreciated that a service may comprise multiple clusters.

Clustering of services may be performed based on two different factors. A first option is to perform clustering based on service requirements. A second option is to perform clustering based on the deployment. In some examples the clustering is performed based on service requirements whilst considering the deployment.

If NFs are dependent on each other (in the sense that if one fails, the other fails annot function properly, or is to be restarted), then in some examples, they will be put in the same restoration cluster. Another example is a complex service with a huge number of NFs, where the developer of the service can group them to restoration clusters, according to the service logic. NFs with affinity requirement may go to the same group, while NFs with anti-affinity requirement may to separate groups.

NFs deployed at the same server, domain, etc. may be put into the same restoration cluster (because an infrastructure failure will likely affect both). Similarly, NFs deployed in domains far from each other may go to separate clusters, as infrastructure problems affecting one will likely not affect the other.

Figure 5:
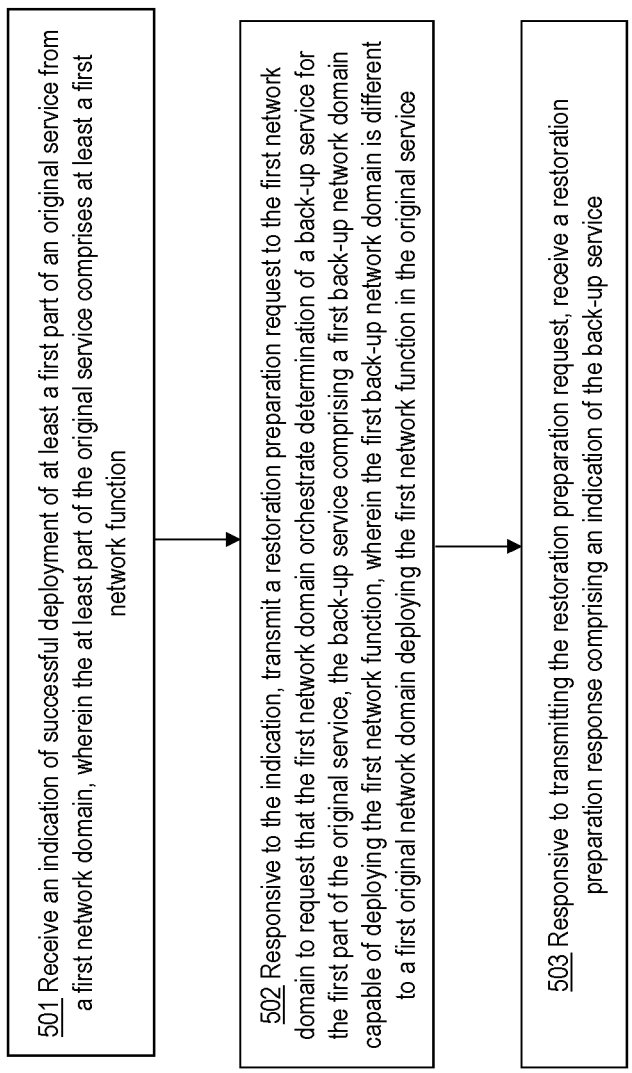
FIG. 5 illustrates a method in a Reliability Life-Cycle Manager (RLCM) for managing orchestration of a back-up service for an original service according to some embodiments.

FIG. 5 illustrates a method in a Reliability Life-Cycle Manager (RLCM) for managing orchestration of a back-up service for an original service.

In step 501 the RLCM receives an indication of successful deployment of at least a first part of an original service from a first network domain (for example, domain B), wherein the at least part of the original service comprises at least a first network function (NF1). The first part of the original service request may, for example, comprise a cluster, a network function, or the entire service. In some examples, the first part of the original service comprises at least two network functions, e.g. NF1 and NF2.

The indication may be received at the RLCM via an orchestrator in domain A. In some examples, the RLCM may determine the first part of the original service as comprising a plurality of network functions wherein the plurality of network functions have affinity to each other.

In step 502, responsive to the indication, the RLCM transmits a restoration preparation request to the first network domain (e.g. domain B) to request that the first network domain initiate determination of a back-up service for the first part of the original service, the back-up service comprising a first back-up network domain capable of deploying the first network function, wherein the first back-up network domain is different to a first original network domain (domain D) deploying the first network function in the original service. The first back-up domain may be any domain that is different to the first original network domain. The back-up service may comprise deployment of NF1 and NF2 (and any other network functions in the original service) in one or more back-up network domains. The restoration preparation request may therefore request that the first network domain initiate determination of one or more back-up network domains which are together capable of deploying the back-up service;

Each of the one or more back-up network domains may be either capable of deploying one of the first network functions or the second network function (or any other NF in the original service), or capable of providing a connection to another one of the one or more back-up network domains which is capable of deploying one of the first network function or the second network function (or any other NF in the original service).

It will be appreciated that a second back-up network domain of the one or more back-up domains capable of deploying the second network function is different to a second original network domain that is deploying the second network function in the original service. It may also be appreciated that the first back-up domain and the second back-up domain may be the same domain, or different domains.

In some examples, a third back-up domain may provide connection between the first back-up domain and the second back-up domain. The third back-up domain may therefore provide part of the back-up service without actually deploying any of the network functions in the original service.

In step 503, responsive to transmitting the restoration preparation request, receiving a restoration response comprising an indication of the back-up service. In other words, the restoration preparation request may comprise an indication of each back-up network domain along with the part of the back-up service that they are capable of providing.

The restoration response may, in some examples, comprise an overall timing associated with deployment of the back-up service. For example, the overall timing may indicate how long the deployment of the back-up service would take if initiated. In some examples, the overall timing may be an estimate. In some examples, the overall timing may be an estimate of a maximum time that the deployment of the back-up service could take. In some examples, the overall timing comprises a first timing associated with deployment of the first network function and a second timing associated with deployment of the second network function. In some examples, the overall timing further comprises a third timing associated with a connection between the first network function and the second network function by the third back-up network domain.

Based on the overall times the RLCM may evaluates and the backup service. If the backup service can be deployed according to service reliability requirements, for example, a predetermined maximum deployment time for a back-up service, the process of determining the back-up service may be considered finished. If however, the overall timing is greater than the predetermined maximum deployment time the RLCM may initiate another deployment trial, for example by transmitting the restoration preparation request to a fourth network domain.

In some examples, the RLCM responsive to a notification of failure of the first network function, initiates deployment of the back-up service. For example, the RLCM may initiate deployment of the back-up service by transmitting a request to each of one or more back-up network domains so as to deploy the back-up service.

In some examples, if a given backup service component (e.g. an NF or connectivity to an NF) cannot be supported by a back-up domain any more (e.g. NF is not supported, or there is some failure in the back-up domain that impacts the possible deployment of the service part) then the back-up domain informs the RLCM and a new deployment trial (only for the impacted service part if possible) is started. This ensures that there is always an up-to-date back-up service deployment plan for a certain service instance.

Figure 6:
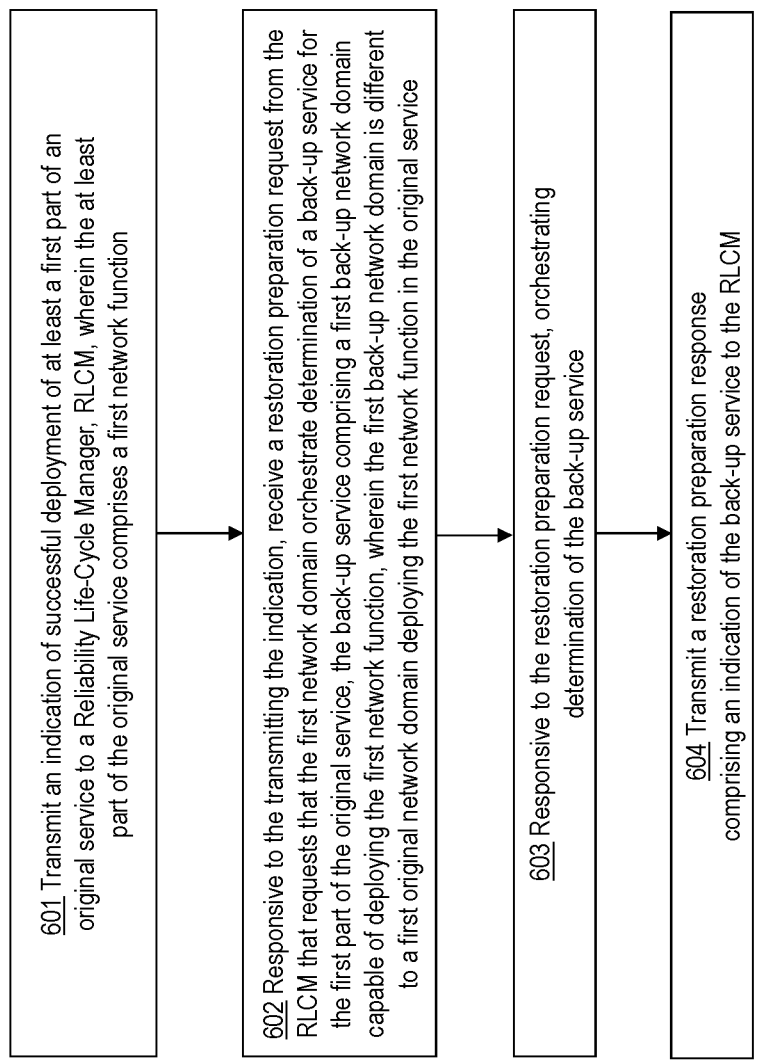
FIG. 6 illustrates a method, in an orchestrator of a first network domain according to some embodiments.

FIG. 6 illustrates a method, in an orchestrator of a first network domain. For example, the method may be performed by orchestrator B in domain B.

In step 601 the orchestrator transmits an indication of successful deployment of at least a first part of an original service to a Reliability Life-Cycle Manager, RLCM. As previously mentioned, the first part of the original service may comprise one of: a cluster, a network function, or the entire original service. It will also be appreciated that the indication may be transmitted to the RLCM via the orchestrator in the domain of the RLCM (e.g. orchestrator A of domain A). The at least part of the original service comprises a first network function (NF1).

In step 602, responsive to transmitting the indication of successful deployment, the orchestrator receives a restoration preparation request from the RLCM that requests that the first network domain initiate determination of a back-up service for the first part of the original service. In some examples, the restoration preparation request comprises a request to provide a back-up service for a cluster of the original service and a service identification (id), which identifies the original service request as well as the required relationship between the original service cluster and the backup service cluster, (e.g., anti-affinity between elements of the corresponding restoration clusters).

The information in the restoration preparation request allows the orchestrator to decide which network functions of the backup service could be deployed in the first network domain. In some examples, the restoration preparation request may comprise information relating to each cluster of an original service. In some examples, a restoration preparation request is transmitted for each individual cluster of an original service. In some examples, there is no information relating to clusters in the restoration preparation request, and the restoration preparation request requests that the back-up service for each network function is provided with anti-affinity for each network function in the original service.

The back-up service comprises a first back-up network domain capable of deploying the first network function, wherein the first back-up network domain is different to a first original network domain deploying the first network function in the original service. The first part of the original service may further comprise a second network function (e.g. NF2), or any number of original network functions. The back-up service may therefore comprise deployment of the first NF and the second NF (and any other original NFs in the original service) in the one or more back-up network domains. Each back-up network domain may be capable of deploying any number of the original NFs, or may provide connectivity between back-up domains that are capable of deploying the original NFs.

In step 603, responsive to the restoration preparation request, the orchestrator initiates determination of the back-up service. In particular, step 603 may comprise the orchestrator determining whether the first network domain is capable of deploying any part of the back-up service. If the first network domain is not capable of deploying any part of the back-up service, step 603 may comprise forwarding the restoration preparation request to a second network domain. If the first network domain is capable of deploying a part of the back-up service, for example it may be able to deploy NF1, step 603 may comprise setting the first network domain as the first back-up domain in the restoration response; generating a partial restoration preparation request relating to the remainder of the back-up service that the first network domain is not capable of deploying (for example NF2); and forwarding the partial restoration preparation request to a second network domain.

The orchestrator may in some examples, emulate deployment of the first network function; determine a first timing associated with deployment of the first network function; and include the first timing in the restoration response associated with the first back-up domain and the first network function.

In some examples, responsive to transmitting a partial restoration preparation request, the orchestrator may receive, from the second network domain, an indication of a second back-up network domain that is capable of deploying the second network function. The orchestrator may also receive a second timing from the second network domain associated with deployment of the second network function.

In some examples, the orchestrator may receive a third timing from the second network domain associated with a time for the second network domain connect the first back-up network domain to the second back-up network domain. Orchestrator may set the second network domain as a third back-up network domain.

In step 604, the orchestrator transmits a restoration response comprising an indication of the back-up service to the RLCM. In some examples, the restoration response is transmitted to the RLCM via the orchestrator of the RLCM's domain (e.g. domain A).

The restoration response may comprise an indication of the first timing, the second timing and/or the third timing.

Figure 7:
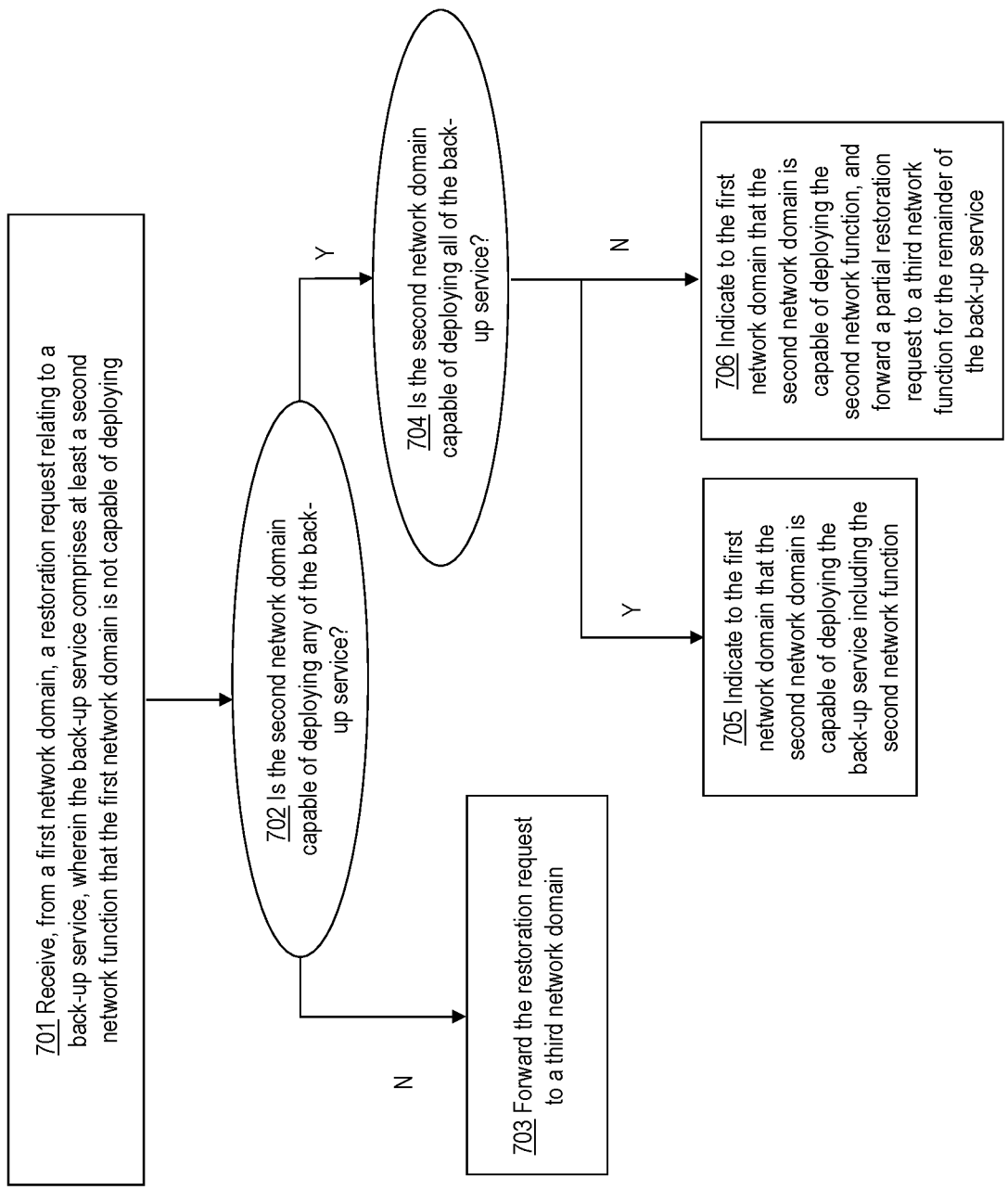
FIG. 7 illustrates a method in an orchestrator of a second network domain according to some embodiments.

FIG. 7 illustrates a method in an orchestrator of a second network domain. The second network domain may comprise any of the network domains B, C and E illustrated in the example topology. In particular, the method of FIG. 7 may be performed by any of the domains receiving a restoration preparation request.

In step 701, the orchestrator receives, from a first network domain, a restoration preparation request relating to a back-up service, wherein the back-up service comprises at least a second network function that the first network domain is not capable of deploying.

In step 702, the orchestrator determines whether the second network domain is capable of deploying any of the back-up service.

In step 703, the orchestrator, responsive to the second network domain being unable to deploy any of the back-up service, forwards the restoration preparation request to a third network domain.

In step 704, the orchestrator determines whether the second network domain is capable of deploying all of the back-up service.

If the second network domain is capable of deploying all of the back-up service, the method passes to step 705 in which the orchestrator indicates to the first network domain that the second network domain is capable of deploying the back-up service including the second network function.

If the second network domain is only capable of deploying part of the back-up service, for example just the second network function, the method passes to step 706. In step 706, the orchestrator indicates to the first network domain that the second network domain is capable of deploying the second network function. The orchestrator may also forward a partial restoration preparation request to a third network domain for the remainder of the back-up service. It will be appreciated that a network domain receiving a partial restoration preparation request may treat the partial restoration preparation request as a restoration preparation request according to FIG. 7.

In other words, if the incoming restoration preparation request (or partial restoration preparation request) cannot be fully deployed by the given domain then the deployment trial process is delegated to the neighbour domain(s) in the orchestration hierarchy. Firstly, the domain splits the request into multiple parts: the part, which can be handled by the given domain is emulated and the relevant timings are measured; while the other request parts are forwarded towards the neighbour domain(s). In some examples, the domain starts a timer(s) for the forwarded partial restoration preparation request(s). In the case of splitting the restoration preparation request, it may also be required to provide connectivity between the parts of the back-up service, which means that connectivity may need to be established between the network functions deployed in different back-up domains. Connectively may in some examples be established through multiple intermediate back-up domains.

It will be appreciated that the splitting of an incoming restoration preparation request may be performed in multiple iterations by successive domains.

For whatever part of the back-up service that the second network domain is capable of deploying, the orchestrator may emulate deployment of that part of the back-up service, determine a timing associated with the deployment of the part of the back-up service, and include the timing in a restoration response to the first network domain.

The restoration response may also comprise any indication received at the second network domain from the third network domain of one or more back-up domains that are capable of providing the remainder of the back-up service. In some examples, timings are also provided to indicate the time required to deploy the remainder of the back-up service.

In particular, a domain, e.g. domain X, that completes the deployment trial process (e.g. is capable of deploying all of the remainder of the back-up service) may generate a restoration response. The restoration response may comprise a so-called target identifier, which may be used by the RLCM to trigger the deployment of the given backup service (or part of the back-up service) in a particular back-up domain if a failure case requires this restoration action. For example, the target identifier could be a backup service instance specific uniform resource locator (url) of the local orchestrator/Lifecycle Manager (LCM) logic of the back-up domain that may initiate the deployment of backup service part in said back-up domain. The restoration response may also comprise the identification(s) (id(s)) of the component(s) (e.g. $NF_i(X)$) that can be deployed in the given domain X, and the timing $t_i(X)$ for deploying $NF_i$ and its related connections, as well as the service id (mentioned in the Optimized restoration preparation request message).

The domain X may then transmit the restoration response back through the orchestration hierarchy towards the RLCM of the domain that handles the service request. When the restoration response arrives to a next domain, e.g. domain Y, the domain Y stops the corresponding timers (based on the service request id and the $NF_{id}$s in the restoration response), and may perform one of the following actions:

If the domain Y has to provide only connectivity between backup service parts then such a target identifier may be included into the message that can be used to initiate the required path establishment over the domain. Domain Y may also calculate $t_i(Y)$, for each $NF_i(Y)$ that already contained by the incoming Optimized restoration response message and includes this information in the restoration response.

Alternatively, If the given domain Y deploys another network function of the backup service request then the restoration response message may be extended with each $t_i(Y)$ values for such $NF_i(Y)$ and its related connections which could be deployed by domain Y, as well as the target identifier that identifies the backup service request part in the domain Y's local scope. In this way, all measured $t_i$ values for a given $NF_i$ are contained by the restoration response, which are measured by the domains where the backup service request has passed.

Figure 8:
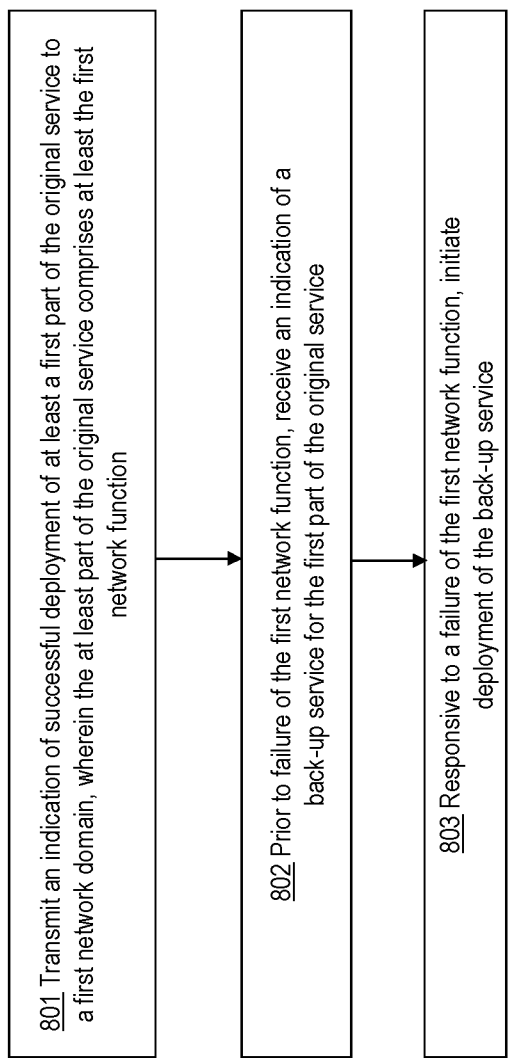
FIG. 8 illustrates a method performed by an orchestrator according to some embodiments.

FIG. 8 illustrates a method performed by an orchestrator according to some embodiments. This method may be performed by an original network domain, e.g. domain D.

In step 801, the orchestrator transmits an indication of successful deployment of at least a first part of the original service to a first network domain, wherein the at least part of the original service comprises at least the first network function.

In step 802, prior to failure of the first network function, the orchestrator receives an indication of a back-up service for the first part of the original service.

In step 803, responsive to a failure of the first network function, the orchestrator initiates deployment of the back-up service. The step of initiating deployment of the back-up service may comprise notifying the RLCM of the failure of the first network function. In some examples, the step of initiating deployment of the back-up service comprises transmitting a request to one or more back-up network domains in the back-up service to deploy the back-up service.

Figure 9:
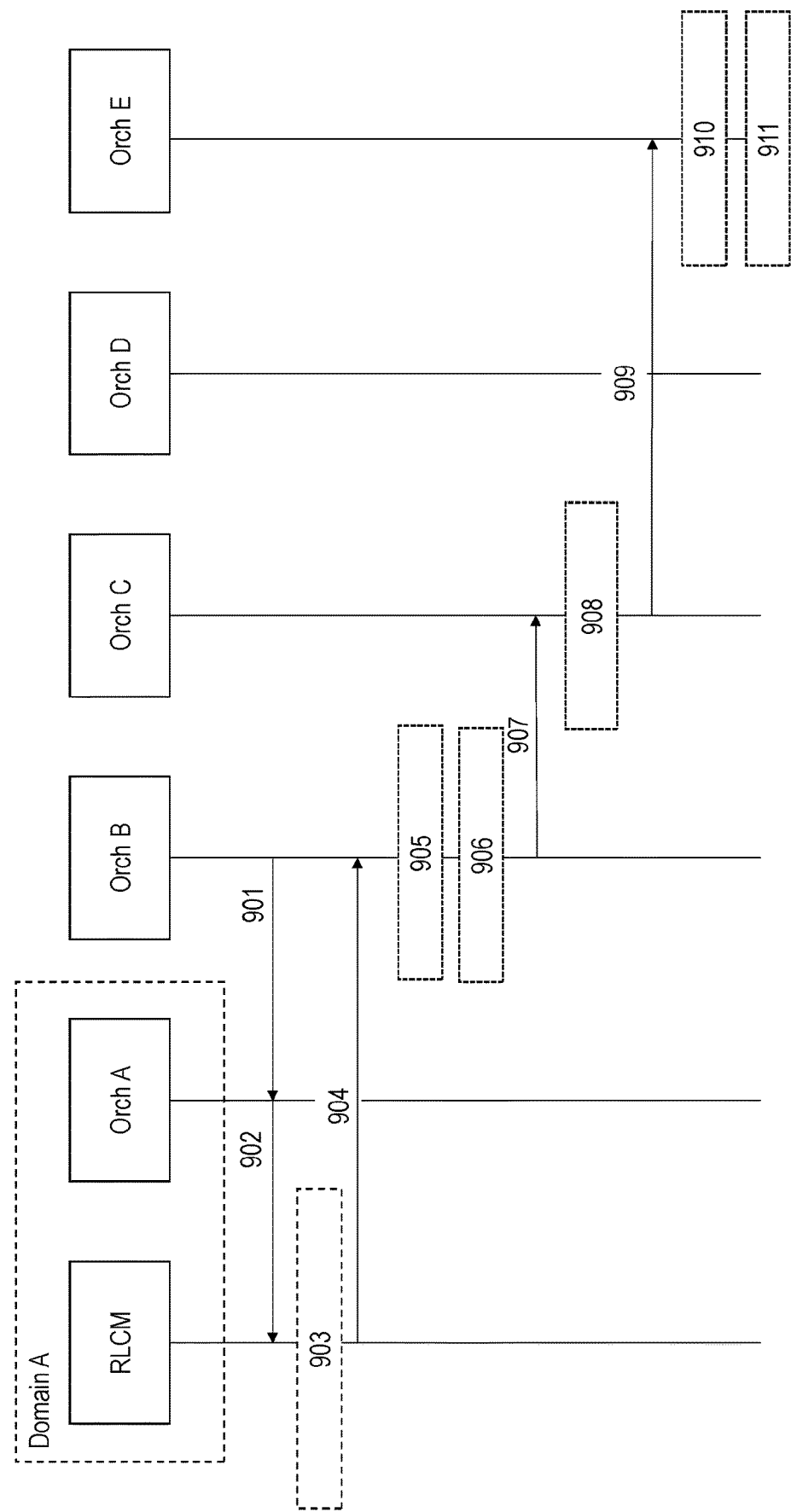
FIG. 9 is a signaling diagram illustrating an example of a restoration preparation request process according to the methods described above.

FIG. 9 is a signaling diagram illustrating an example of a restoration preparation request process according to the methods described above. This example utilizes the example topology illustrated in FIG. 4.

In step 901, the orchestrator of domain B (Orch B) transmits an indication of successful deployment of at least part of an original service. As illustrated, in step 902 the indication of successful deployment may be transmitted to the RLCM via an orchestrator in the same domain as the RLCM, i.e. the orchestrator of domain A (Orch A). It will be appreciated that in some examples, the RLCM may be co-located with Orch A.

In this example, the at least part of the original service comprises the first network function (NF1) and the second network function (NF2). The first part of the original service request may, for example, comprise a cluster or the entire service. In some examples, the RLCM may determine the first part of the original service as comprising a plurality of network functions wherein the plurality of network functions have affinity.

In the step 903, the RLCM constructs a restoration preparation request relating to a back-up service. The restoration preparation request requests for the determination of a back-up service having the same requirements as the original service. However, an additional requirement is added, namely that a given cluster (or network function) of the backup service request has to be deployed in anti-affinity to the same cluster (or network function) of the original service request. For example, the additional requirement may state that any NF component belonging to a given cluster of the backup service request must be deployed in anti-affinity with any NF component of the same cluster of the original service request. Furthermore, the connections between the network functions of a given cluster of the backup service request may be realized by using different resources than the connections between the network functions of the same cluster of the original service request. These anti affinity requirements mean that, if a failure impacts any network function of the original service request, the necessary backup network functions may be deployed by using different infrastructure resources (e.g., different domains, sites, datacenter).

In step 904 the RLCM transmits the restoration preparation request to the orchestrator in domain B. In some examples, the restoration preparation request may be transmitted to any appropriate domain. In this example, the restoration preparation request is transmitted to the domain from which the indication of successful deployment was received at the domain of the RLCM.

In step 905, Orch B initiates determination of the back-up service. In this example, the Orch B first determines whether domain B is capable of deploying any part of the back-up service. In this example, domain B is capable of deploying NF1 but not capable of deploying NF2.

In step 906, Orch B then, responsive to determining that the domain B is capable of deploying NF1, emulates deployment of NF1. In step 906, it will be appreciated that Orch B may not actually deploy NF1. In other words, the emulation may comprise placing the NF1 but not actually deploying NF1, e.g., no resource reservation is done for NF1.

Step 906 may also comprise the Orch B determining a first timing $t_1(B)$ associated with deployment of NF1. For example, Orch B may start a timer when starting the emulation and may stop the timer when the emulation of NF1 is complete. The time required to establish a path between NF 1 and the domain border point towards domain C may also be considered, for this Orch B may start a separate timer.

In step 907, the Orch B determines the remainder of the back-up service that it is not capable of deploying, in this example, NF2. The Orch B then transmits a partial restoration preparation request to the orchestrator of domain C, Orch C. The partial restoration preparation request requests that Orch C initiate determination of the remainder of the back-up service (e.g. the back-up for NF2). It will be appreciated that the Orch B would not transmit the partial restoration preparation request to Orch D, as domain D is deploying the original service request, and so would not be able to meet the anti-affinity requirement for the back-up service.

In step 908, the Orch C determines whether Domain C is capable of deploying the remainder of the back-up service, e.g. NF2. In this example, domain C cannot deploy NF2. However, domain C recognizes that is can support connectivity between NF1 and NF2. Domain C therefore starts a timer associated with connecting NF1 and NF2.

In step 909, Orch C transmits a partial restoration preparation request for NF2 to the orchestrator of domain E, Orch E.

In step 910, Orch E determines whether Domain E is capable of deploying the remainder of the back-up service, e.g. NF2. In this example, Domain E is capable of deploying NF2.

In step 911, Orch E then emulates deployment of NF2. In step 911, it will be appreciated that Orch E may not actually deploy NF2. In other words, the emulation may comprise placing the NF2 but not actually deploying NF2, e.g., no resource reservation is done for NF2.

Step 911 may also comprise the Orch E determining a second timing $t_2(E)$ associated with deployment of NF2. For example, Orch E may start a timer when starting the emulation. Orch E may then stop the timer when NF2 has been emulated. The time required to establish a path between NF2 and the domain border point towards domain C may considered in the second timing calculation.

When a domain is capable of deploying the entire back-up service indicated in a restoration preparation request (or a partial restoration preparation request), the Deployment trial process is finished. There may therefore be no further delegation towards neighbor domains.

Figure 10:
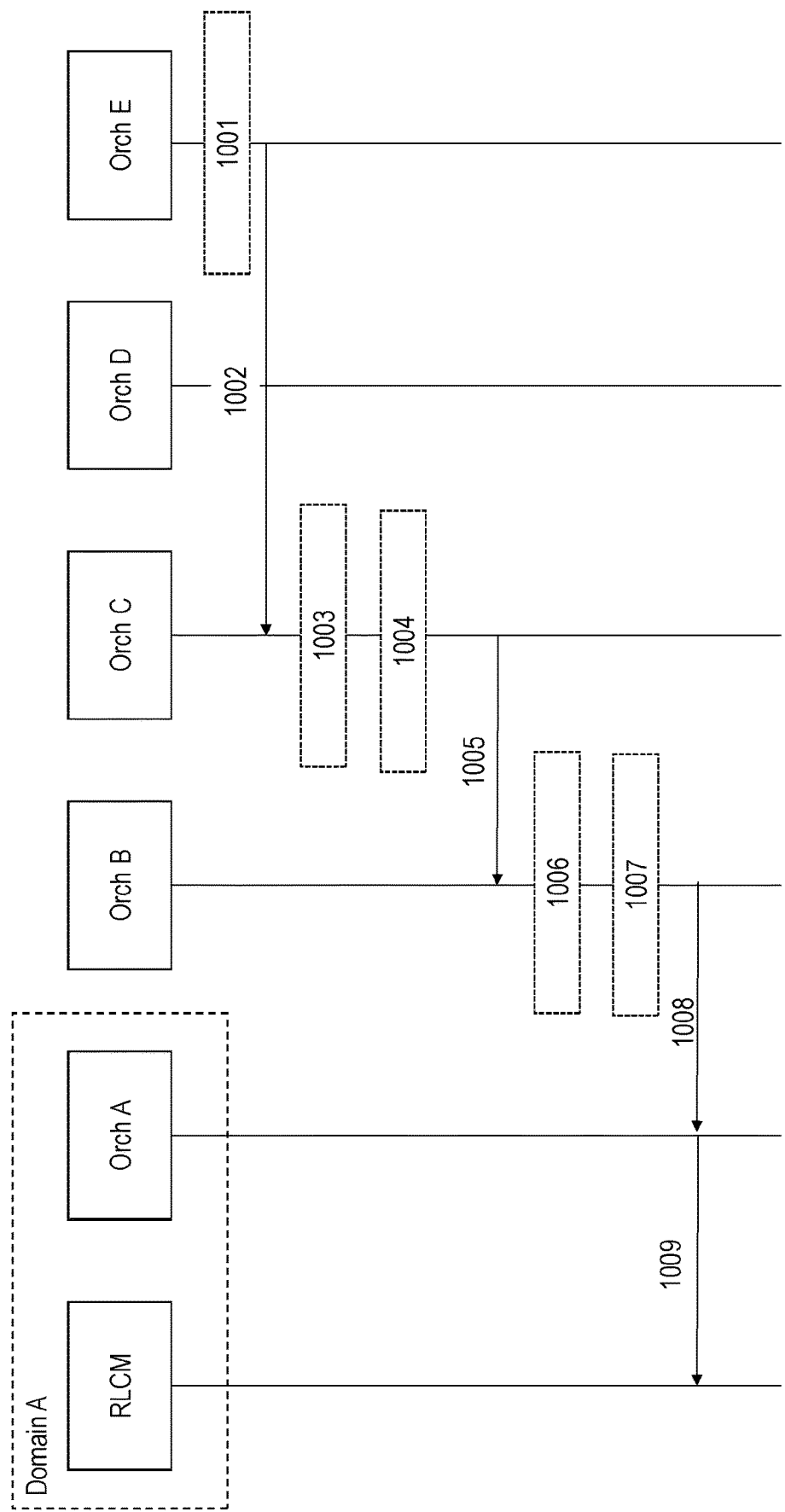
FIG. 10 is a signaling diagram illustrating an example of a restoration response process according to the methods described with reference to FIGS. 5 to 8.

FIG. 10 is a signaling diagram illustrating an example of a restoration response process according to the methods described with reference to FIGS. 5 to 8. This example utilizes the example topology illustrated in FIG. 4. The steps illustrated in FIG. 10 may follow on from those performed in FIG. 9.

In step 1001, when Orch E has finished the deployment trial process as illustrated in FIG. 9, the Orch E generates a restoration response message. The restoration response message comprises identification of the deployment of NF2, $NF_2(E)$, and the deployment time $t_2(E)$ for NF2. The restoration response may also comprise a target identifier to use to identify the backup service request part by the RLCM in Domain E scope.

In step 1002, Orch E transmits the restoration response to Orch C.

In step 1003, Orch C stops the timer started in step 908 for the connectivity to domain E. In step 1004, Orch C extends the restoration response with the identification of the connectivity to NF2, $NF_2(C)$, the timing for triggering deployment of NF2, $t_2(C)$, and the target identifier in domain C scope. Since domain C may provide the connectivity between the backup NF1 and NF2, the Orch C may further include another target identifier into the restoration response that can be used to initiate the path establishment if the backup NFs should be deployed.

In step 1005, Orch C transmits the restoration response to Orch B.

In step 1006, Orch B stops the timer started in step 906 to determine $t_2(B)$.

In step 1007, Orch B extends the restoration response with the identification of the connectivity to NF2, $NF_2(B)$, the timing for triggering deployment of NF2, $t_2(B)$, the identification for the deployment of NF1 $NF_1(B)$ and the timing for deployment of NF1 $t_1(B)$. Target identifiers in the scope of domain B for triggering NF1 and NF2 deployment may also be included.

In step 1008, Orch B transmits the restoration response to the Orch A. Orch A may then forward the restoration response to the RLCM in step 1009.

When the restoration trial process is performed for an original service (for example, a restoration trial process may be performed for each cluster of an original service separately) and the RLCM receives the restoration response it may calculate the restoration times for any failure that impacts any $NF_i$ component of the service by considering the $t_i(\ )$ values received in the restoration response. If the restoration response comprises multiple $t_i(\ )$ values with corresponding target identifiers (e.g. urls), it means that multiple domains may initiate the deployment of a given backup NF. A generic option may be that the RLCM stores all information and if a failure occurs then all involved domains are triggered. Whilst this option may require multiple triggers for a certain restoration cluster, it does guarantee that the service can be restored in the minimum time even if there is an error in the orchestration plane of any domain. Another option for the RLCM is to select the domains that are triggered to deploy a backup service cluster if failure occurs. One way may be to select domains which provide the smallest restoration time ($t_r$), but if the service requirement (e.g. maximum tolerable restoration time) enables higher $t_r()$ values then other options can be selected.

However, aspects other than just the restoration time may also be considered when selecting domains to trigger, for example domains that belong to a particular federation of providers may be preferred (e.g., by taking the case from the above illustrative example, if deployment of the backup service cluster is needed one option could be to trigger domain B, C and E directly at the same time using their provided urls, but if a restoration time requirement enables would be met, it is also an option to trigger only domain B and in this case domain E will be invoked by domain B and C using normal orchestration delegation process to deploy NF2).

By selecting which domains should be triggered in different failure cases (that impacts different NFs of the original service instance) the backup deployment plan is constructed by the RLCM. Even in this case, the RLCM may store the alternative backup deployment plans. If any preferred domain cannot deploy the backup components for any reason (e.g., orchestration plane error) then other domain(s) can be triggered within short time, so the failover time may still be kept low even in a more serious failure situation.

By using the above information the RLCM may build and maintain a database for a given original service that contains the target identifiers (e.g. urls), which need to be used for trigger a back-up service restoration if failure occurs.

It may happen that due to some reason (e.g. lack of available resources) the Restoration trial process is unsuccessful. For example, if a domain in a given branch of the orchestration hierarchy cannot deploy the request (part) and delegation towards further domains is not possible. The domain may then assemble a restoration response with a "fail" note. When the RLCM receives this message, it may initiate another Restoration trial process in order to find other domains that can deploy the request.

There may be two options for triggering the backup service if a failure occurs: an RLCM-based centralized option and a domain-based distributed option.

For the RLCM-based centralized option, the RLCM is the responsible for managing the restoration process. The RLCM may locally store the backup service deployment plan in a database.

When the RLCM is informed about which NF(s) of an original service instance is impacted by a failure, either by direct notification or a fastest fault detection time, the RLCM may determine, which restoration back-up service instances should be deployed. In some examples, where a failure has occurred in a cluster of an original service, the entire cluster may be restored as a back-up. The RLCM may then trigger the deployment of the required backup NFs and their related connection by using the corresponding urls. The back-up domain(s) that handle the backup NF(s) may then notify the RLCM about the successful or failed backup NF deployment, so RLCM will aware if the service restoration has been completed or not.

For the domain-based distributed option, the domains where the original NF components of the given service instance are deployed manage the fault handling. Since the domain where the failure event occurs may directly initiate the restoration process (instantiation of the backup NF(s) in the corresponding domain(s) directly, the RLCM is not involved) the restoration time may be further decreased. In this option, the RLCM informs each original domain, where certain NF component(s) of the original service instance are deployed, about the backup deployment plan for failure of the NF components relative to each original domain. Even in this case the RLCM may also maintain a restoration database as a backup copy.

If a given original domain recognizes that a certain NF is impacted by a failure, then the domain orchestrator system may initiate directly the back-up domain(s) where the backup NF(s) and connection should be deployed according to the backup deployment plan. The back-up domain(s) may notify the original domain about the successful or failed backup NF deployment and the original domain may inform the RLCM about the outcome of the backup deployment. Alternatively, the back-up domain(s) may directly inform the RLCM about the outcome of the back-up deployment.

In both above mentioned alternatives, in any failure case, any connection(s) between the newly deployed backup service for an original cluster of an original service and the original NF components originally connected to the original cluster, are established accordingly initiated by the RLCM.

After the backup deployment plan is constructed based on the information gathered by using contents of the restoration response, the back-up deployment plan may be stored on per-restoration cluster basis.

For example, consider an original service which comprises a first cluster containing network functions NF1 and N2 deployed by domain D, and a second cluster containing network functions NF3 and NF4 deployed by domain E (utilizing the topology of FIG. 4 as an example).

In one example, the RLCM may store a back-up service deployment plan table as follows:

TABLE 1

A back-up service deployment plan table

| Cluster 1 | | |
|---|---|---|
| NF2 | url_B | url_E |
| NF2 | url_B | url_E |
| Connection | url_C | |
| Cluster 2 | | |
| NF3 | url_3 | url_4 |
| NF4 | url_3 | url_4 |
| Connection | url_conn | |

In this example, if any NF belonging to a cluster (say NF1) is impacted by a failure, the entire cluster is re-deployed. This is why the table comprises similar rows for each NF belonging to a cluster (url_B and url_E, indicating domain B and E, where the backup NF component and their related connectivity should be deployed if NF1 [or NF2] is impacted by a failure). Since the backup NF1 and NF2 are connected to each other via domain C, the table also contains a connectivity row with an identifier of domain C. If the RLCM manages the restoration the information may be stored only in the RLCM. In the distributed case, the relevant parts of the table may be forwarded to the domain where the original NF components are deployed. In the example, NF1 and NF2 are deployed in domain D, so the rows of the table which are valid for NF1 and NF2 are forwarded to domain D. Since the connection between the NFs should be established even in this case this information is also provided for the corresponding domains by the RLCM.

Figure 11:
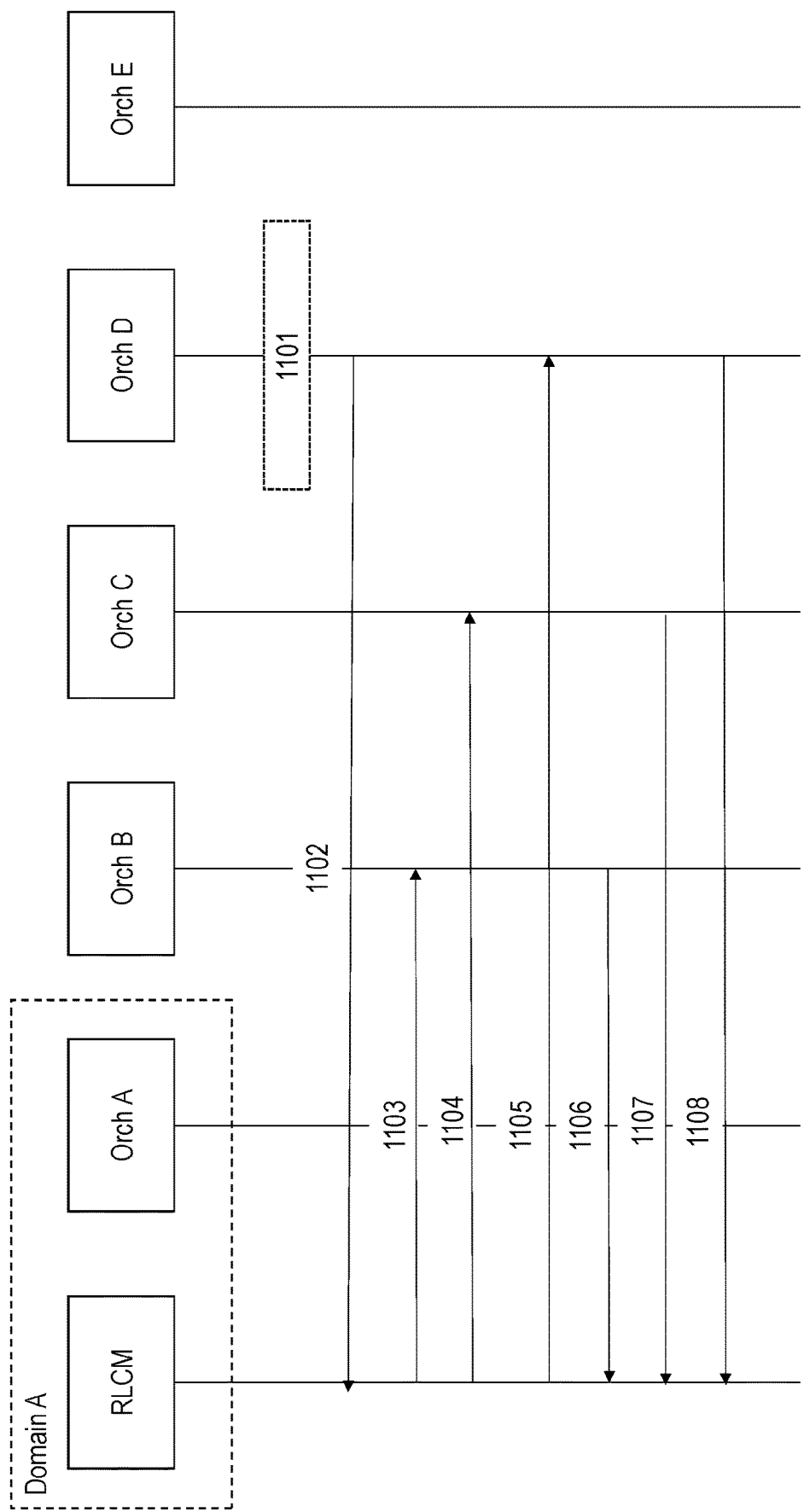
FIG. 11 illustrates an example of RLCM-based centralized backup service deployment.

FIG. 11 illustrates an example of RLCM-based centralized backup service deployment.

In step 1101, a failure occurs in domain D affecting either or both of NF1 and NF2.

In step 1102, Orch D indicates the failure to the RLCM.

In steps 1103, 1104 and 1105, the RLCM transmits a request to each of domains B, C and E to trigger deployment of the back-up service of NF1 and NF2 as indicated by the back-up deployment plan. The urls for each of domains B, C and E may be from the back-up service deployment plan table as illustrated above. In this example, even if only NF1 is affected by the failure, the entire cluster is restored.

In steps 1106, 1107 and 1108 domains B, C and E transmit confirmations to the RLCM to indicate that the back-up service has been deployed.

Figure 12:
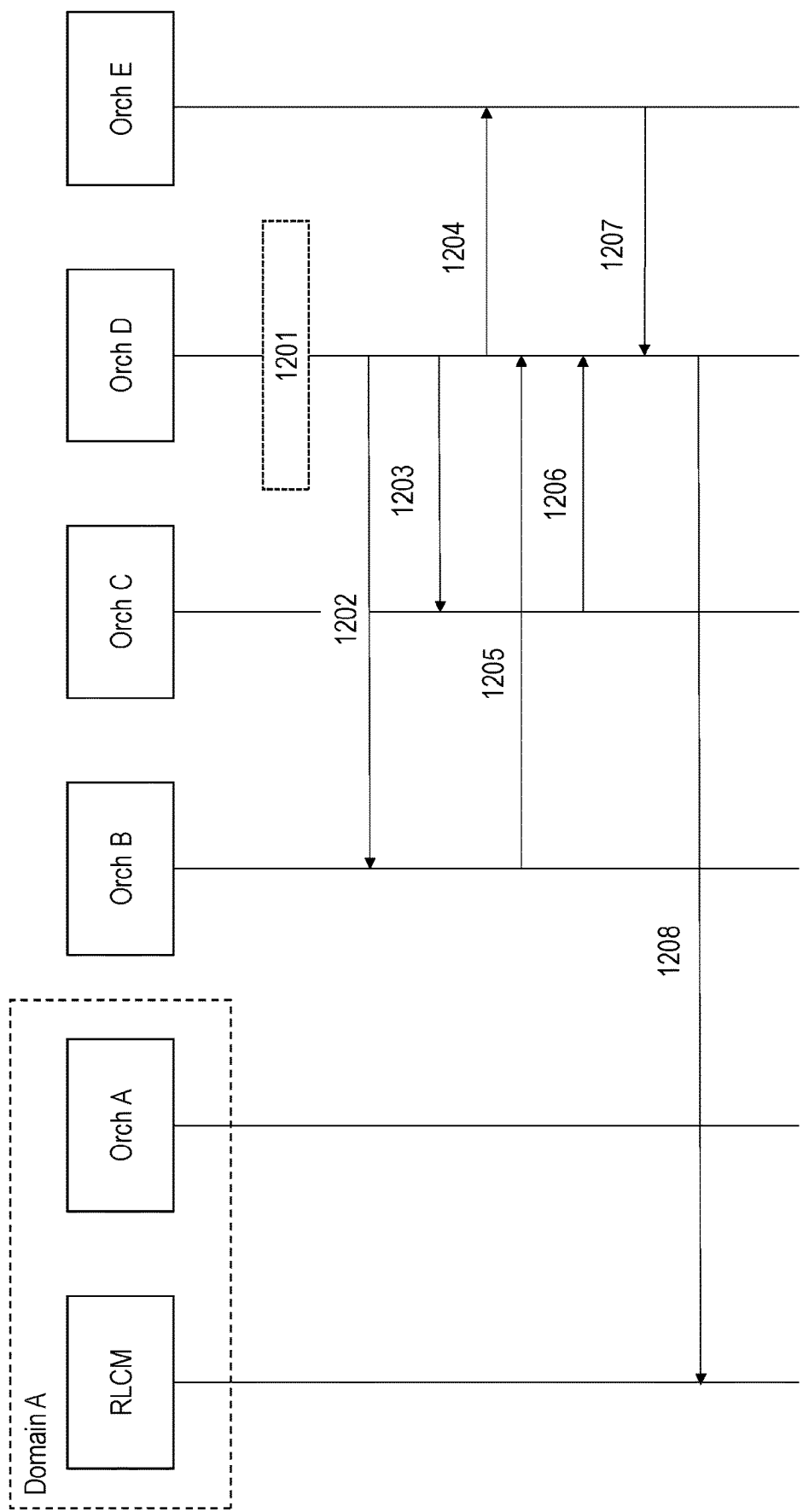
FIG. 12 illustrates an example of a domain-based distributed back-up service deployment.

FIG. 12 illustrates an example of a domain-based distributed back-up service deployment.

In step 1201 a failure occurs in domain D affecting either or both of NF1 and NF2.

In step 1202, 1203 and 1204 Orch D transmits a trigger to each of domains B, C and D to trigger deployment of the back-up service of NF1 and NF2 as indicated by the back-up deployment plan. The urls for each of domains B, C and E may be from the back-up service deployment plan table as illustrated above. In this example, even if only NF1 is affected by the failure, the entire cluster is restored.

In steps 1205, 1206 and 1207 after the successful backup NF deployment, domains B, C and E confirms the deployment by sending a confirmation message back to domain D (step 10*b*, blue dotted line).

When each backup NF and connectivity is established, domain D sends a message to RLCM in step 1208 confirming that deployment of the backup service part is completed. In some examples, the involved back-up domains may alternatively or additionally send confirmation messages to the RCLM.

If some of the backup NFs cannot be deployed for any reason, either the original or the back-up domains may inform the RLCM about the problem of instantiating the required backup service components. Then the RLCM may propose alternative restoration actions.

In the examples described above, the failure handling is performed on restoration cluster base. This means that if any original NF belonging to a given cluster fails, all backup NFs are deployed. If not all original NFs belonging to a given cluster are failed then the non-impacted NFs and the deployed backup NFs are working in parallel, which may cause inconsistency. Therefore, when deployment of the backup NFs belonging to the impacted restoration cluster is finished, the RLCM may initiate the orchestration system to delete the unnecessary original NFs. Similarly, the connections belonging to the deleted original NFs are removed from the network to achieve a consistent deployment setup.

According to the above described method a restoration may be performed for the impacted service instances by using a previously determined backup deployment plan based on the restoration trial process. The domains where the backup NFs should be deployed if failure occurs are determined in advance in the service deployment phase.

However, it may happen that during the lifetime of a given service instance a given back-up domain which should host a backup NF (service part) cannot support the back-up service component anymore (e.g., due to lack of resources in the back-up domain or policy changes). In this case, the given back-up domain may inform the RLCM that it will not be able to deploy the given (backup) NFs by mentioning the same service specific target identifier (url), which was used in the restoration trial process.

Based on the target identifier (url) the RLCM is able to find which backup NF(s) are currently not deployable and the RLCM may initiate a restoration trial process for determining the placement and the connections of the impacted NF(s). By using this update mechanism an up-to-date backup deployment plan may be maintained by the RLCM by actively reacting to any capability changes of the back-up domains.

Figure 13:
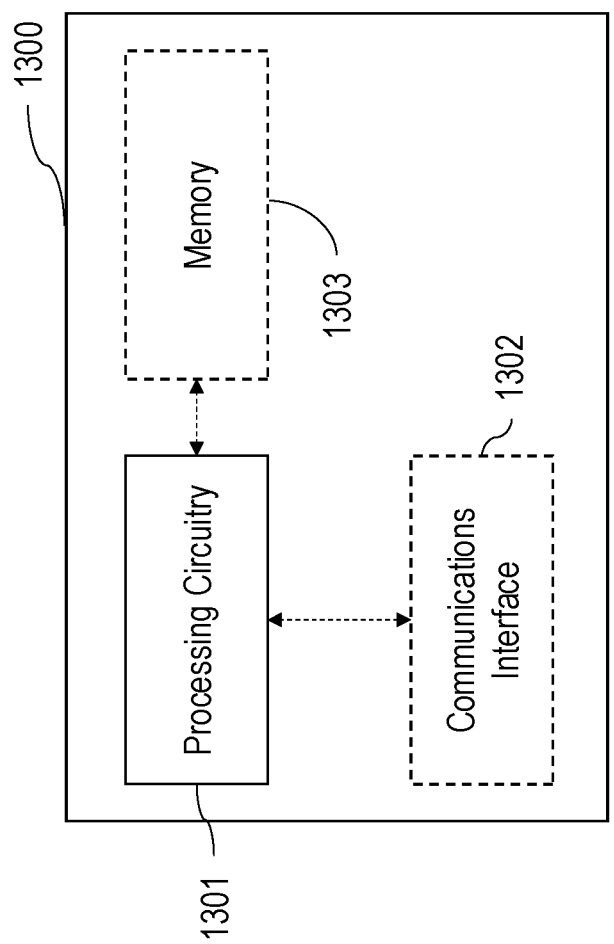
FIG. 13 illustrates an RLCM comprising processing circuitry (or logic)

FIG. 13 illustrates an RLCM 1300 comprising processing circuitry (or logic) 1301. The processing circuitry 1301 controls the operation of the RLCM 1300 and can implement the method described herein in relation to an RLCM 1300. The processing circuitry 1301 can comprise one or more processors, processing units, multi-core processors or modules that are configured or programmed to control the RLCM 1300 in the manner described herein. In particular implementations, the processing circuitry 1301 can comprise a plurality of software and/or hardware modules that are each configured to perform, or are for performing, individual or multiple steps of the method described herein in relation to the RLCM 1300.

Briefly, the processing circuitry 1301 of the RLCM 1300 is configured to: receive an indication of successful deployment of at least a first part of an original service from a first network domain, wherein the at least part of the original service comprises at least a first network function; responsive to the indication, transmit a restoration preparation request to the first network domain to request that the first network domain initiate determination of a back-up service for the first part of the original service, the back-up service comprising a first back-up network domain capable of deploying the first network function, wherein the first back-up network domain is different to a first original network domain deploying the first network function in the original service; and responsive to transmitting the restoration preparation request, receive a restoration response comprising an indication of the back-up service.

In some embodiments, the RLCM 1300 may optionally comprise a communications interface 1302. The communications interface 1302 of the RLCM 1300 can be for use in communicating with other nodes, such as other virtual nodes. For example, the communications interface 1302 of the RLCM 1300 can be configured to transmit to and/or receive from other nodes requests, resources, information, data, signals, or similar. The processing circuitry 1301 of RLCM 1300 may be configured to control the communications interface 1302 of the RLCM 1300 to transmit to and/or receive from other nodes requests, resources, information, data, signals, or similar.

Optionally, the RLCM 1300 may comprise a memory 1303. In some embodiments, the memory 1303 of the RLCM 1300 can be configured to store program code that can be executed by the processing circuitry 1301 of the RLCM 1300 to perform the method described herein in relation to the RLCM 1300. Alternatively or in addition, the memory 1303 of the RLCM 1300, can be configured to store any requests, resources, information, data, signals, or similar that are described herein. The processing circuitry 1301 of the RLCM 1300 may be configured to control the memory 1303 of the RLCM 1300 to store any requests, resources, information, data, signals, or similar that are described herein.

Figure 14:
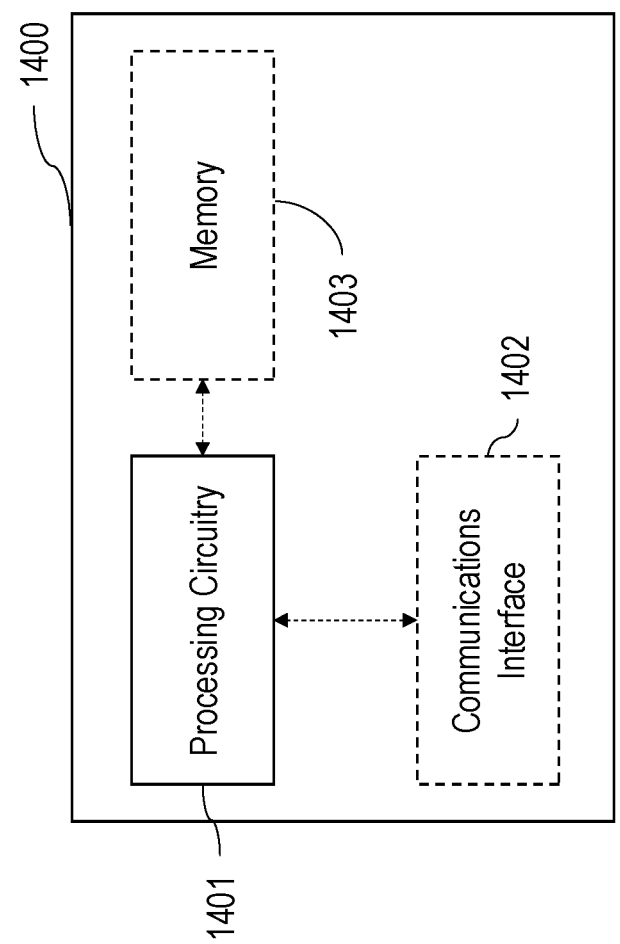
FIG. 14 illustrates an orchestrator comprising processing circuitry (or logic)

FIG. 14 illustrates an orchestrator 1400 comprising processing circuitry (or logic) 1401. The orchestrator may be the orchestrator of domain B as described above. The processing circuitry 1401 controls the operation of the orchestrator 1400 and can implement the method described herein in relation to an orchestrator 1400. The processing circuitry 1401 can comprise one or more processors, processing units, multi-core processors or modules that are configured or programmed to control the orchestrator 1400 in the manner described herein. In particular implementations, the processing circuitry 1401 can comprise a plurality of software and/or hardware modules that are each configured to perform, or are for performing, individual or multiple steps of the method described herein in relation to the orchestrator 1400.

Briefly, the processing circuitry 1401 of the orchestrator 1400 is configured to: transmit an indication of successful deployment of at least a first part of an original service to a Reliability Life-Cycle Manager, RLCM, wherein the at least part of the original service comprises a first network function; responsive to transmitting the indication of successful deployment, receive a restoration preparation request from the RLCM that requests that the first network domain initiate determination of a back-up service for the first part of the original service, the back-up service comprising a first back-up network domain capable of deploying the first network function, wherein the first back-up network domain is different to a first original network domain deploying the first network function in the original service; responsive to the restoration preparation request, initiate determination of the back-up service; and transmit a restoration response comprising an indication of the back-up service to the RLCM.

In some embodiments, the orchestrator 1400 may optionally comprise a communications interface 1402. The communications interface 1402 of the orchestrator 1400 can be for use in communicating with other nodes, such as other virtual nodes. For example, the communications interface 1402 of the orchestrator 1400 can be configured to transmit to and/or receive from other nodes requests, resources, information, data, signals, or similar. The processing circuitry 1401 of orchestrator 1400 may be configured to control the communications interface 1402 of the orchestrator 1400 to transmit to and/or receive from other nodes requests, resources, information, data, signals, or similar.

Optionally, the orchestrator 1400 may comprise a memory 1403. In some embodiments, the memory 1403 of the orchestrator 1400 can be configured to store program code that can be executed by the processing circuitry 1401 of the orchestrator 1400 to perform the method described herein in relation to the orchestrator 1400. Alternatively or in addition, the memory 1403 of the orchestrator 1400, can be configured to store any requests, resources, information, data, signals, or similar that are described herein. The processing circuitry 1401 of the orchestrator 1400 may be configured to control the memory 1403 of the orchestrator 1400 to store any requests, resources, information, data, signals, or similar that are described herein.

Figure 15:
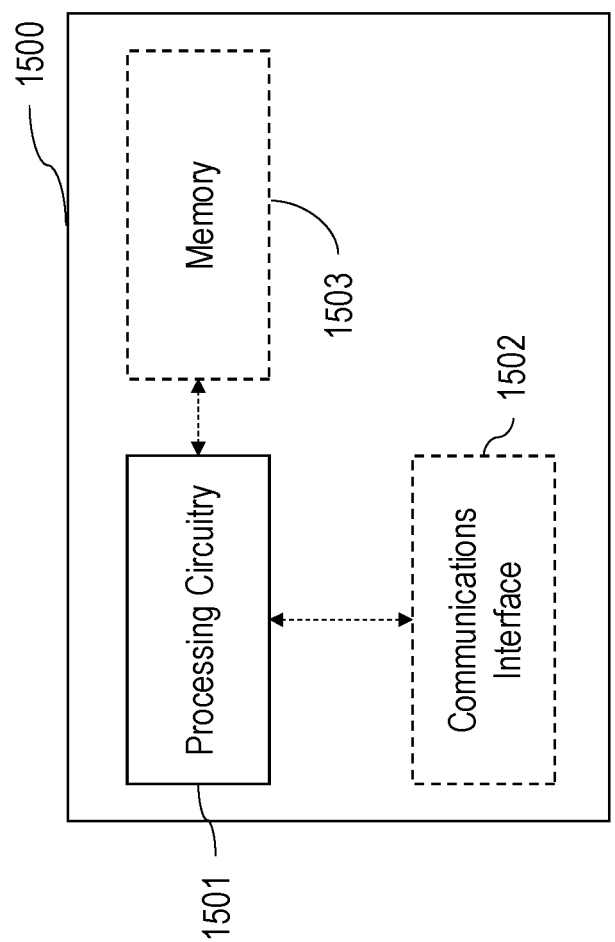
FIG. 15 illustrates an orchestrator comprising processing circuitry (or logic)

FIG. 15 illustrates an orchestrator 1500 comprising processing circuitry (or logic) 1501. The orchestrator 1500 may be the orchestrator of domains B, C or E as described above. The processing circuitry 1501 controls the operation of the orchestrator 1500 and can implement the method described herein in relation to an orchestrator 1500. The processing circuitry 1501 can comprise one or more processors, processing units, multi-core processors or modules that are configured or programmed to control the orchestrator 1500 in the manner described herein. In particular implementations, the processing circuitry 1501 can comprise a plurality of software and/or hardware modules that are each configured to perform, or are for performing, individual or multiple steps of the method described herein in relation to the orchestrator 1500.

Briefly, the processing circuitry 1501 of the orchestrator 1500 is configured to: receive, from a first network domain, a restoration preparation request relating to a back-up service, wherein the back-up service comprises at least a second network function that the first network domain is not capable of deploying; determine whether the second network domain is capable of deploying any of the back-up service; responsive to the second network domain being unable to deploy any of the back-up service, forward the restoration preparation request to a third network domain; and responsive to the second network domain being able to deploy the second network function, indicate to the first network domain that the second network domain is capable of deploying the second network function.

In some embodiments, the orchestrator 1500 may optionally comprise a communications interface 1502. The communications interface 1502 of the orchestrator 1500 can be for use in communicating with other nodes, such as other virtual nodes. For example, the communications interface 1502 of the orchestrator 1500 can be configured to transmit to and/or receive from other nodes requests, resources, information, data, signals, or similar. The processing circuitry 1501 of orchestrator 1500 may be configured to control the communications interface 1502 of the orchestrator 1500 to transmit to and/or receive from other nodes requests, resources, information, data, signals, or similar.

Optionally, the orchestrator 1500 may comprise a memory 1503. In some embodiments, the memory 1503 of the orchestrator 1500 can be configured to store program code that can be executed by the processing circuitry 1501 of the orchestrator 1500 to perform the method described herein in relation to the orchestrator 1500. Alternatively or in addition, the memory 1503 of the orchestrator 1500, can be configured to store any requests, resources, information, data, signals, or similar that are described herein. The processing circuitry 1501 of the orchestrator 1500 may be configured to control the memory 1503 of the orchestrator 1500 to store any requests, resources, information, data, signals, or similar that are described herein.

Figure 16:
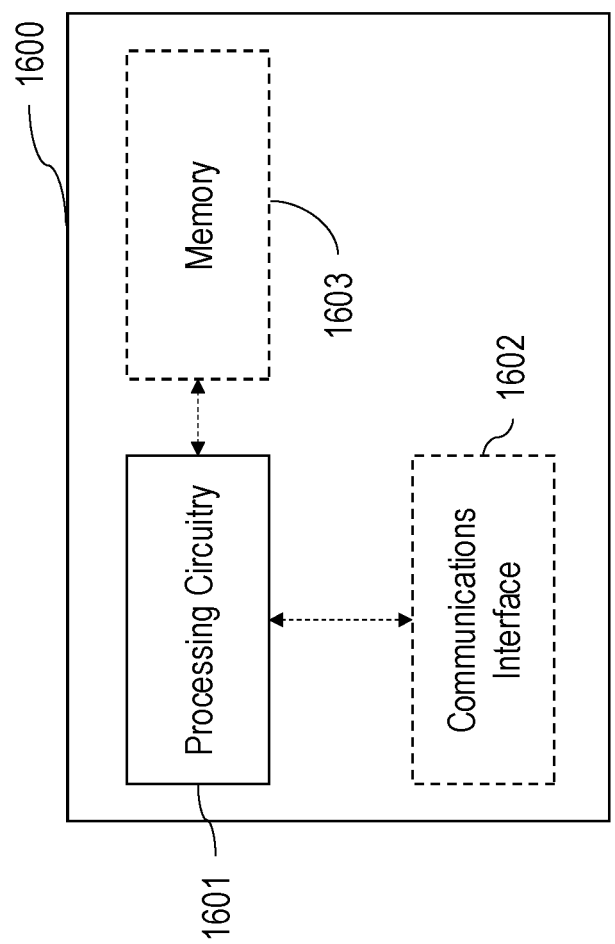
FIG. 16 illustrates an orchestrator comprising processing circuitry (or logic).

FIG. 16 illustrates an orchestrator 1600 comprising processing circuitry (or logic) 1601. The orchestrator 1600 may be the orchestrator of domain D as described above. The processing circuitry 1601 controls the operation of the orchestrator 1600 and can implement the method described herein in relation to an orchestrator 1600. The processing circuitry 1601 can comprise one or more processors, processing units, multi-core processors or modules that are configured or programmed to control the orchestrator 1600 in the manner described herein. In particular implementations, the processing circuitry 1601 can comprise a plurality of software and/or hardware modules that are each configured to perform, or are for performing, individual or multiple steps of the method described herein in relation to the orchestrator 1600.

Briefly, the processing circuitry 1601 of the orchestrator 1600 is configured to: transmit an indication of successful deployment of at least a first part of the original service to a first network domain, wherein the at least part of the original service comprises at least the first network function; prior to failure of the first network function, receive an indication of a back-up service for the first part of the original service; and responsive to a failure of the first network function, initiate deployment of the back-up service.

In some embodiments, the orchestrator 1600 may optionally comprise a communications interface 1602. The communications interface 1602 of the orchestrator 1600 can be for use in communicating with other nodes, such as other virtual nodes. For example, the communications interface 1602 of the orchestrator 1600 can be configured to transmit to and/or receive from other nodes requests, resources, information, data, signals, or similar. The processing circuitry 1601 of orchestrator 1600 may be configured to control the communications interface 1602 of the orchestrator 1600 to transmit to and/or receive from other nodes requests, resources, information, data, signals, or similar.

Optionally, the orchestrator 1600 may comprise a memory 1603. In some embodiments, the memory 1603 of the orchestrator 1600 can be configured to store program code that can be executed by the processing circuitry 1601 of the orchestrator 1600 to perform the method described herein in relation to the orchestrator 1600. Alternatively or in addition, the memory 1603 of the orchestrator 1600, can be configured to store any requests, resources, information, data, signals, or similar that are described herein. The processing circuitry 1601 of the orchestrator 1600 may be configured to control the memory 1603 of the orchestrator 1600 to store any requests, resources, information, data, signals, or similar that are described herein.

In embodiments described herein, if a failure occurs the restoration time can significantly be decreased since just after the failure is detected the involved domains in the restoration process can directly be triggered in order to immediately deploy the required service components (e.g. NFs, connectivity) restoring the service. The time-consuming trial and error-based re-deployment process needed to be performed by the orchestration system when the failure is detected can entirely be saved.

In some embodiments described herein, an upper limit for the restoration time (even on a per NF component granularity) may be guaranteed for the considered failure cases.

Fast service restoration without the need of pre-deployed backup service components may be provided. This results in sparing resource utilization, while the level of service reliability is still high.

If any change occurs in a domain that impacts the deployment capability of certain backup components in the domain, the restoration trial process may be initiated and performed resulting a new, up-to-date backup service deployment plan for the impacted services.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, implemented by a computing system, of managing orchestration of a back-up service for an original service, the method comprising:
    receiving an indication of successful deployment of at least a first part of the original service from a first network domain, wherein the at least first part of the original service comprises at least a first network function;
    responsive to the indication, transmitting a restoration preparation request to the first network domain to request that the first network domain initiate determination of the back-up service for the first part of the original service, the back-up service comprising a first back-up network domain capable of deploying the first network function, wherein the first back-up network domain is different to a first original network domain deploying the first network function in the original service;
    responsive to transmitting the restoration preparation request, receiving a restoration response comprising an indication of the back-up service; and
    determining the first part of the original service as comprising a plurality of network functions, wherein the plurality of network functions have affinity.

2. The method of claim 1, wherein:
    the first part of the original service further comprises a second network function;
    the restoration preparation request requests that the first network domain initiate determination of one or more back-up network domains which are together capable of deploying the back-up service; and
    the back-up service comprises deployment of the first network function and the second network function in the one or more back-up network domains.

3. The method of claim 2, wherein each of the one or more back-up network domains is either capable of:
    deploying one of the first network functions or the second network function; or
    providing a connection to another one of the one or more back-up network domains which is capable of deploying one of the first network function or the second network function.

4. The method of claim 2, wherein a second back-up network domain of the one or more back-up network domains capable of deploying the second network function is different to a second original network domain that is deploying the second network function in the original service.

5. The method of claim 4 wherein the one or more back-up network domains further comprises a third back-up network domain capable of connecting the first back-up network domain to the second back-up network domain.

6. The method of claim 5, wherein the indication of the back-up service comprises an indication of the third back-up network domain providing a connection between the first network function and the second network function.

7. The method of claim 4, wherein the indication of the back-up service comprises an indication of the first back-up network domain associated with the first network function, and the second back-up network domain associated with the second network function.

8. The method of claim 1, wherein the restoration response further comprises an overall timing associated with deployment of the back-up service.

9. The method of claim 8, wherein:
    the first part of the original service further comprises a second network function;
    the back-up service comprises deployment of the first network function and the second network function in the one or more back-up network domains; and
    the overall timing comprises a first timing associated with deployment of the first network function and a second timing associated with deployment of the second network function.

10. The method of claim 9, wherein the overall timing further comprises a third timing associated with a connection between the first network function and the second network function by a third back-up network domain providing a connection between the first network function and the second network function.

11. The method of claim 8, further comprising, responsive to the overall timing being greater than a predetermined timing, transmitting the restoration preparation request to a fourth network domain.

12. The method of claim 1, further comprising, responsive to a notification of failure of the first network function, initiating deployment of the back-up service.

13. The method of claim 12, wherein the initiating comprises transmitting a request to each of one or more back-up network domains so as to deploy the back-up service.

14. A computing system for managing orchestration of a back-up service for an original service, the computing system comprising:
processing circuitry and memory circuitry, the memory circuitry storing instructions executable by the processing circuitry whereby the processing circuitry is configured to:
receive an indication of successful deployment of at least a first part of the original service from a first network domain, wherein the at least first part of the original service comprises at least a first network function;
responsive to the indication, transmit a restoration preparation request to the first network domain to request that the first network domain initiate determination of the back-up service for the first part of the original service, the back-up service comprising a first back-up network domain capable of deploying the first network function, wherein the first back-up network domain is different to a first original network domain deploying the first network function in the original service;
responsive to transmitting the restoration preparation request, receive a restoration response comprising an indication of the back-up service; and
determine the first part of the original service as comprising a plurality of network functions, wherein the plurality of network functions have affinity.

15. The computing system of claim 14, wherein:
the first part of the original service further comprises a second network function;
the restoration preparation request requests that the first network domain initiate determination of one or more back-up network domains which are together capable of deploying the back-up service; and
the back-up service comprises deployment of the first network function and the second network function in the one or more back-up network domains.

16. The computing system of claim 15, wherein each of the one or more back-up network domains is either capable of:
deploying one of the first network functions or the second network function; or
providing a connection to another one of the one or more back-up network domains which is capable of deploying one of the first network function or the second network function.

17. The computing system of claim 15, wherein a second back-up network domain of the one or more back-up network domains capable of deploying the second network function is different to a second original network domain that is deploying the second network function in the original service.

18. The computing system of claim 14, wherein:
the restoration response further comprises an overall timing associated with deployment of the back-up service;
the first part of the original service further comprises a second network function;
the back-up service comprises deployment of the first network function and the second network function in the one or more back-up network domains; and
the overall timing comprises a first timing associated with deployment of the first network function and a second timing associated with deployment of the second network function.

* * * * *